Sept. 6, 1960 G. A. CRAIG 2,951,574
PATH ADJUSTING MEANS FOR CONVEYORS
Filed April 29, 1959 2 Sheets-Sheet 1

INVENTOR.
George A. Craig
BY
ATT'YS.

Sept. 6, 1960
G. A. CRAIG
2,951,574
PATH ADJUSTING MEANS FOR CONVEYORS
Filed April 29, 1959
2 Sheets-Sheet 2
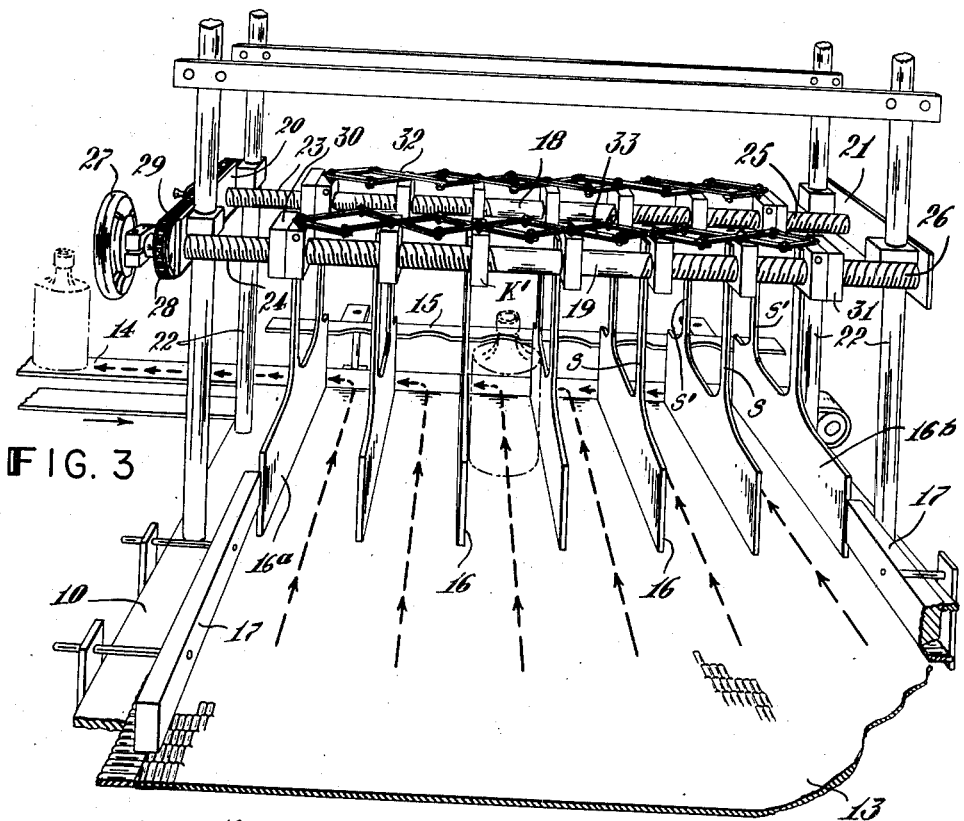
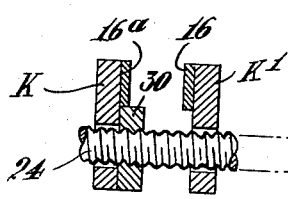 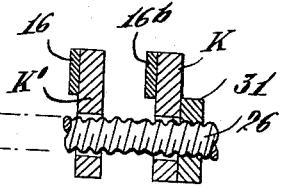
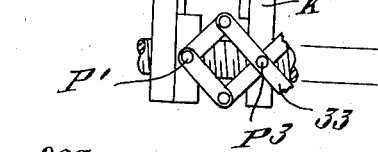
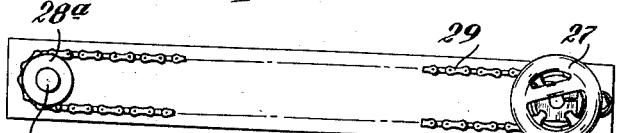
INVENTOR.
George A. Craig
BY
Roberts Cushman & Grover
ATT'YS.

United States Patent Office 2,951,574
Patented Sept. 6, 1960

2,951,574

PATH ADJUSTING MEANS FOR CONVEYORS

George A. Craig, Louisville, Ky., assignor to Machinery Service Company, Louisville, Ky., a corporation of Kentucky Filed Apr. 29, 1959, Ser. No. 809,831

2 Claims. (Cl. 198—30)

This invention pertains to conveyor apparatus, and more especially to an article feeder such as is employed, for example, for delivering articles to a processing machine, for instance a filling machine, and wherein articles, for example, containers, in parallel rows, are advanced by an intermittently moving conveyor, and with means whereby the articles forming the several parallel rows are combined to form a single row, the invention being more particularly directed to means for adjusting the guides or spacer plates which keep the articles aligned to form said parallel rows as they are advanced by the conveyor, and to means whereby the several parallel plates of a set may be adjusted toward and from each other while maintaining their parallelism thereby to vary the width of the article-guiding channels to accommodate bottles of different diameters.

In feeder apparatus of this general type, it has heretofore been customary so to support the guides or spacer plates of a set that when it becomes necessary to change their spacing, because of a change in the diameter of the articles which are being processed, it is necessary to loosen bolts by means of a wrench or the like and then, with the assistance of some sort of gauge, to set the plates the proper distance apart, each from the next, and then again to tighten the retainer bolts. This is a time-consuming operation, a matter of real importance in an establishment, for example, a bottling plant where production capacity is a matter which must always be considered. Herein, for convenience, but without intended limitation, the articles to be handle are referred to as bottles.

A principal object of the present invention is to provide means whereby the plates of a set may be simultaneously adjusted to vary the width of the channels between them while still keeping them in accurately parallel relation. A further object is to provide means for adjusting all of said plates simultaneously and in such a way as to insure that the channels between adjacent plates of the set will all be of the same width; and further, to provide means whereby such adjustment may be made without the necessity of removing or loosening bolts or the employment of a wrench or the like, and whereby, after the plates have once been adjusted, they will remain in adjusted position without liability of change in relative position until they are again purposely readjusted. A further object is to provide means for adjusting the separator plates of such a machine, which is of simple construction and such that it may be installed in existing machines of this general type without substantial remodeling of the machine and at a reasonable and practical cost. Other and further objects and advantages of the invention will be pointed out in the following more detailed description and by reference to the accompanying drawings wherein:

Fig. 3 is a fragmentary perspective view looking toward the delivery end of the conveyor, and showing the spacer plates and the means for adjusting them in accordance with the present invention;

Fig. 4 is a fragmentary horizontal section through the axis of one of the adjusting shafts showing supports for four of the spacer plates;

Fig. 5 is a plan view showing the same parts as those illustrated in Fig. 4, but also showing the lazy tongs arrangement whereby motion is transmitted to the several separator plate supports; and Fig. 6 is a front elevation of the gear and chain mechanism by which the shafts are rotated.

Figure 1:
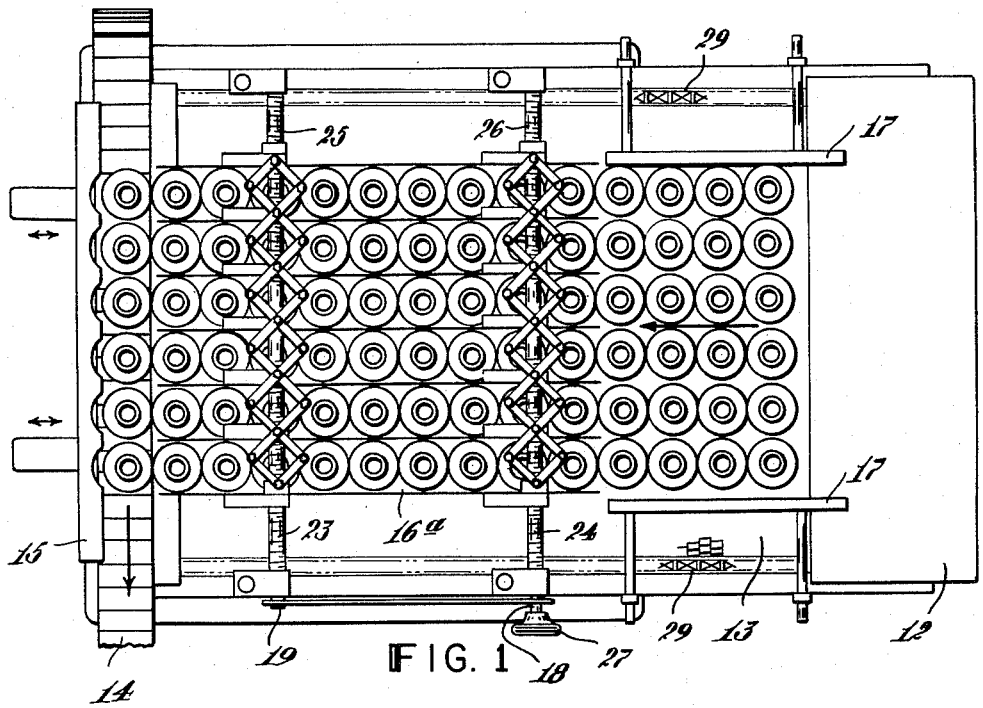
Fig. 1 is a diagrammatic plan view of a bottle feeder of a conventional type, having spacer adjusting means in accordance with the present invention incorporated therein.
Figure 2:
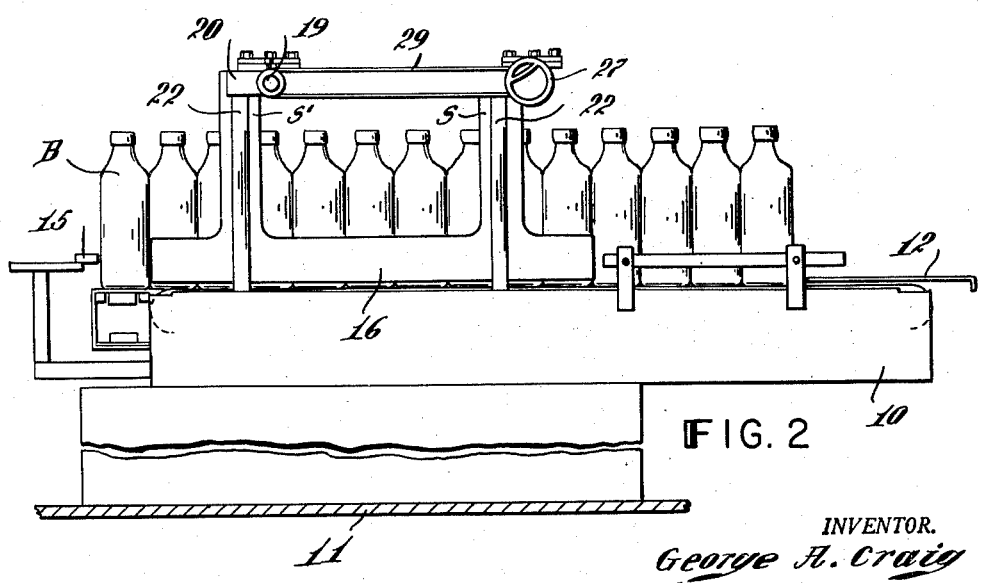
Fig. 2 is a fragmentary side elevation of a bottle feeder such as shown in Fig. 1.

Referring to the drawings, Figs. 1–3 illustrate a bottle feeder of a conventional type, having incorporated therein the novel spacer plate adjusting means according to the present invention. The bottle feeder comprises a frame 10 resting on a floor or platform 11, a dump board 12, a multiple row conveyor 13, a second conveyor 14 moving at right angles to the conveyor 13, an oscillating pusher bar 15, and spacer plates 16 adjustable by means hereinafter to be described.

Bottles to be processed are placed on the dump board 12 and moved onto the conveyor 13 by which they are conveyed between parallel guides 17 to the spacer plates 16 which define a plurality of parallel paths. The spacer plates 16 are uniformly spaced approximately one bottle diameter apart and the conveyor 13 moves intermittently to deliver one transverse row of bottles to the conveyor 14 at each forward movement. When the conveyor 13 moves to advance the bottles, the oscillating pusher bar 15 moves to a position such as to engage the foremost bottle in each of the rows on the conveyor 14 and to stop them properly centered on the conveyor 14. When the conveyor 13 stops, the bar 15 recedes to permit the forward row of bottles on conveyor 14 to be carried away by the conveyor 14 which moves at a sufficient speed to remove one such row of bottles before the next row is presented.

When a change-over is made from bottles of one diameter to bottles of a different diameter, it is necessary to adjust the spacing between the plates 16 to accommodate the new bottle size. This has heretofore been done by adjusting each spacer plate by hand, a troublesome and time-consuming operation. By the present invention, a single adjustment automatically relocates the spacer plates simultaneously to the new desired adjustment and holds the plates in this adjustment until a new change is made.

In accordance with the present invention, the spacer plates 16 are suspended from two horizontal parallel shafts 18 and 19 which are journaled in mounting plates 20 and 21. The plates 20 and 21 are supported by vertical rods 22 which are fixed to the main frame 10 of the feeder apparatus. Shafts 18 and 19 are threaded at opposite ends thereof, ends 23 and 24 being provided with right-hand threads and the ends 25 and 26 being provided with left-hand threads. The shaft 19 is provided with a hand wheel 27 at one end thereof and with a sprocket 28, turns a similar sprocket 28a (Fig. 6) on the shaft 18 by means of chain 29. Rotation of the shaft 19 thus simultaneously rotates the shaft 18 by the same amount and in the same direction.

Each of the spacer plates is, as here illustrated, an integral piece of metal of a shape to provide a smooth, elongate, bottle-contacting blade and two spaced, upwardly directed suspension members S and S' (Fig. 3). The suspension members S and S' of the outside spacer plates 16a and 16b are fixed at their upper ends to blocks K provided with tapped or threaded portions 30 and 31, respectively, which engage the threaded ends 23, 24 and 25, 26 of shafts 18 and 19 so as to be moved toward and away from each other as the shafts 18 and 19 are rotated. The blocks K' fixed to the suspension members of plates 16 (intermediate the end plates 16a and 16b) have openings of a size such as to permit said blocks to slide along shafts 18 and 19, and are connected together by lazy-tongs linkages 32 and 33 along shafts 18 and 19, respectively. As shown in Fig. 5, the endmost pivot pins P, P' of the linkage are fixed in the blocks K from which the end plates 16a and 16b are suspended, while each of the intervening pins P³ is fixed to a block K' from which a corresponding plate 16 is suspended. By means of the lazy-tongs linkages 32 and 33, the equal spacing between the spacer plates 16 is maintained as the end plates 16a and 16b are moved by rotating the shafts 18 and 19.

While, as herein specifically illustrated and described, the shafts 18 and 19 are provided with both right and left-hand screw threads, it is within the purview of the invention to provide each shaft with one set of screw threads, either right or left-hand, as preferred, with corresponding internal threads in one only of the end blocks K, so that adjustment of all of the plates is in the same direction.

From the foregoing description, it will be apparent that a simple and positive means is provided for adjusting the spacing between the spacing plates to any desired amount simply by turning a hand wheel, and with the assurance that the parts will retain their adjusted positions until purposely readjusted. This adjustment is much more rapid and positive than the hand adjustment heretofore provided and can be performed easily by the machine operator without requiring the help of a skilled mechanic.

It should be understood that the foregoing description is for the purpose of illustration only and that the invention includes all modifications falling within the scope of the appended claims.

I claim:

1. In combination, in a bottle-feeding machine of the kind in which rows of bottles are advanced by a conveyor along parallel paths which are defined by parallel, uniformly-spaced plates, a plurality of horizontal shafts extending transversely over said conveyor and supporting said plates, each shaft having right and left-hand threaded portions on opposite ends thereof, means for turning said shafts simultaneously by the same amount and a lazy-tongs linkage extending parallel to each shaft and connecting adjacent plates, one plate on each shaft having means engaging the right-hand threaded portion of said shaft, another plate on each shaft engaging the left-hand threaded portion of said shaft, the other plates being slidably mounted on said shaft so as to be movable by said lazy-tongs linkages.

2. In combination, in a bottle-feeding machine of the kind in which rows of bottles are advanced by a conveyor along parallel paths which are defined by parallel, uniformly-spaced plates, horizontal shafts extending transversely over said conveyor and supporting said plates, each shaft having a screw-threaded portion, means for turning one of said shafts, gear means for turning another of said shafts simultaneously by the same amount and in the same direction, and a lazy-tongs linkage extending parallel to each respective shaft, each linkage having its endmost pivots fixed relatively to the endmost plates, and having one of its intermediate pivots fixed to a corresponding one of the intervening plates, at least one of the outer plates being fixed to a part having a threaded opening which engages the threaded portion of said shaft, the intermediate plates being slidably mounted on said shaft so as to be movable by said lazy-tongs linkages.

References Cited in the file of this patent

UNITED STATES PATENTS

| | | |
|---|---|---|
| 738,749 | Alfred | Sept. 15, 1903 |
| 2,242,177 | Ferguson | May 13, 1941 |
| 2,517,983 | Crosland | Aug. 8, 1950 |